United States Patent
Lietzke, Jr. et al.

(10) Patent No.: US 8,908,867 B2
(45) Date of Patent: *Dec. 9, 2014

(54) AUTOMATIC RECOVERY OF TPM KEYS

(71) Applicant: Lenovo (Singapore) Pte. Ltd., Singapore (SG)

(72) Inventors: Matthew P. Lietzke, Jr., Cary, NC (US); James P. Hoff, Wake Forest, NC (US); David Rivera, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 114 days.

This patent is subject to a terminal disclaimer.

(21) Appl. No.: 13/652,138

(22) Filed: Oct. 15, 2012

(65) Prior Publication Data

US 2014/0105400 A1 Apr. 17, 2014

Related U.S. Application Data

(63) Continuation of application No. 11/461,429, filed on Jul. 31, 2006, now Pat. No. 8,290,164.

(51) Int. Cl.
*H04L 9/00* (2006.01)

(52) U.S. Cl.
USPC .......................................................... 380/277

(58) Field of Classification Search
CPC .............................. G06F 21/57; H04L 9/0897

USPC .......................................................... 380/277
See application file for complete search history.

(56) References Cited

U.S. PATENT DOCUMENTS

| | | | |
|---|---|---|---|
| 8,290,164 B2* | 10/2012 | Lietzke et al. | 380/277 |
| 2005/0138389 A1* | 6/2005 | Catherman et al. | 713/185 |
| 2005/0166051 A1* | 7/2005 | Buer | 713/173 |
| 2005/0235141 A1* | 10/2005 | Ibrahim et al. | 713/164 |
| 2005/0257073 A1* | 11/2005 | Bade et al. | 713/193 |
| 2008/0025513 A1* | 1/2008 | Lietzke et al. | 380/277 |

\* cited by examiner

*Primary Examiner* — Kambiz Zand
*Assistant Examiner* — Aubrey Wyszynski
(74) *Attorney, Agent, or Firm* — Ference & Associates LLC

(57) ABSTRACT

A trusted platform module (TPM) is a silicon chip that constitutes a secure encryption key-pair generator and key management device. A TPM provides a hardware-based root-of-trust contingent on the generation of the first key-pair that the device creates: the SRK (storage root key). Each SRK is unique, making each TPM unique, and an SRK is never exported from a TPM. Broadly contemplated herein is an arrangement for determining automatically whether a TPM has been replaced or cleared via loading a TPM blob into the TPM prior to the first time it is to be used (e.g. when a security-related software application runs). If the TPM blob loads successfully, then it can be concluded that the TPM is the same TPM that was used previously. If the TPM blob cannot be loaded, then corrective action will preferably take place automatically to configure the new TPM.

17 Claims, 1 Drawing Sheet

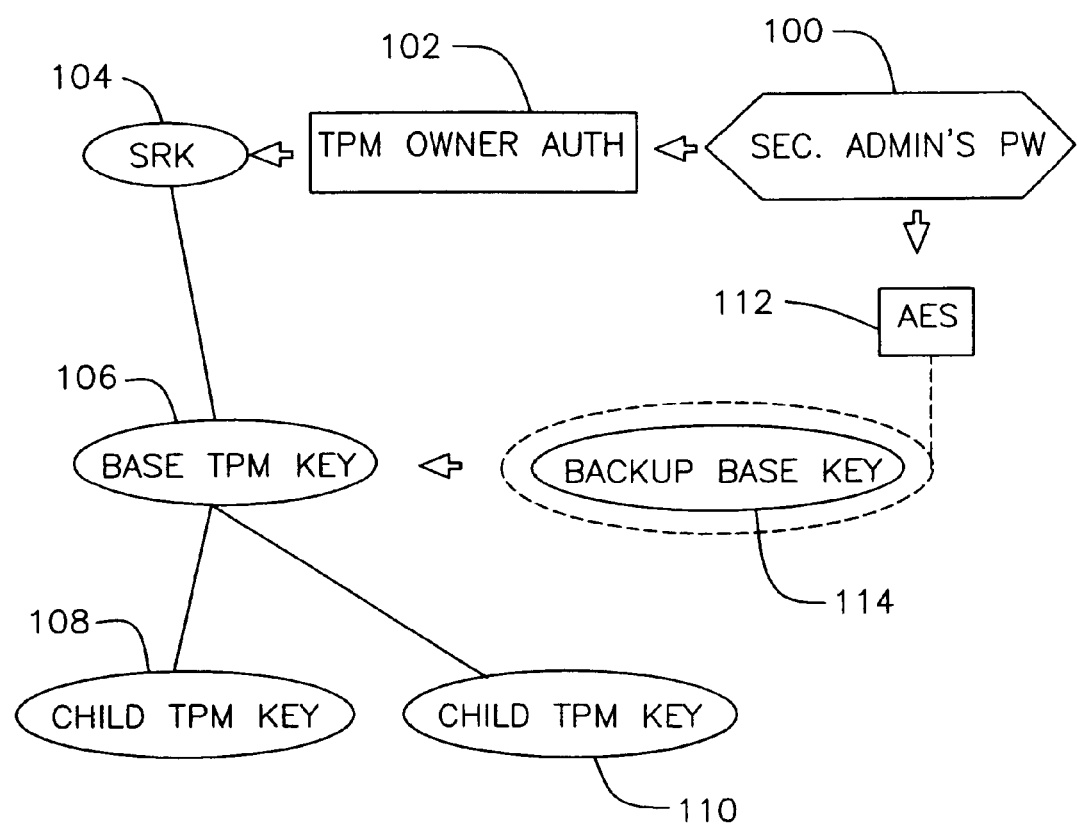

AUTOMATIC RECOVERY OF TPM KEYS

CROSS REFERENCE TO RELATED APPLICATION

This application is a continuation application of U.S. patent application Ser. No. 11/461,429, entitled "AUTOMATIC RECOVERY OF TPM KEYS", filed on Jul. 31, 2006, the contents of which are incorporated by reference herein.

FIELD OF THE INVENTION

The present invention relates generally to trusted platform modules (TPMs) and configuring the same and/or replacements for the same.

BACKGROUND OF THE INVENTION

A trusted platform module (TPM) is a silicon chip that constitutes a secure encryption key-pair generator and key management device. A TPM provides a hardware-based root-of-trust contingent on the generation of the first key-pair that the device creates: the SRK (storage root key). Each SRK is unique, making each TPM unique, and an SRK is never exported from a TPM.

A major drawback that has been encountered in hardware-based roots-of-trust is that TPM devices can at times fail or be inadvertently cleared. Also, it has been increasingly common for a TPM to be integrated into other devices (such as a computer motherboard) that may itself fail and require replacement. Therefore, it is essential to be able to configure a replacement TPM and make existing security credentials usable again.

Typically, this is brought about via a series of manual steps: determining that a TPM has been replaced, generating an SRK on the new TPM, and importing all existing keys. Because this process does not take place automatically, it is subject to the vagaries of manual intervention and manipulation, with the result that there might not be an identical configuration to what existed originally.

In view of the foregoing, a need has accordingly been recognized in connection with effecting a process that avoids the pitfalls of the type of manual process just described.

SUMMARY OF THE INVENTION

In accordance with at least one presently preferred embodiment of the present invention, there is broadly contemplated herein an arrangement for determining whether a TPM has been replaced or cleared via loading a TPM blob into the TPM prior to the first time it is to be used (e.g. when a security-related software application runs). If the TPM blob loads successfully, then it can be concluded that the TPM is the same TPM that was used previously. If the TPM blob cannot be loaded, then corrective action will preferably take place automatically to configure the new TPM.

In summary, one aspect of the invention provides an apparatus comprising: an arrangement for generating a base key outside of a trusted platform module; an arrangement for importing the generated base key into a trusted platform module; said importing arrangement acting to produce a trusted platform module blob; an arrangement for ascertaining the usability of a trusted platform module in further operations via employing the trusted platform module blob.

Another aspect of the present invention provides a method comprising the steps of: generating a base key outside of a trusted platform module; importing the generated base key into a trusted platform module, producing a trusted platform module blob; ascertaining the usability of a trusted platform module in further operations via employing the trusted platform module blob.

Furthermore, an additional aspect of the invention provides a program storage device readable by machine, tangibly embodying a program of instructions executable by the machine to perform method steps, said method steps comprising: generating a base key outside of a trusted platform module; importing the generated base key into a trusted platform module, producing a trusted platform module blob; ascertaining the usability of a trusted platform module in further operations via employing the trusted platform module blob.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 is a schematic overview of a process according to the present invention.

DESCRIPTION OF THE PREFERRED EMBODIMENTS

Referring to FIG. 1, in accordance with a presently preferred embodiment of the present invention, before configuring a TPM for the first time, a software key-pair (or base key) 106 is generated outside of the TPM. This base key is encrypted with a symmetric key that is derived from a password 100 that the security administrator specifies. This encrypted base key is then stored to disk, and designated as the backup base key (114).

An owner-auth 102 is then specified to take ownership of the TPM. The owner-auth 102 is preferably derived from the same password (specified by the security administrator) 100 that was used to encrypt the base key 106. This process generates a unique SRK 104 for the TPM and prepares the TPM for use. The base key 106 that was generated previously is imported into the TPM, with the SRK 104 as its parent. As a result of importing the base key into the TPM, a TPM blob is returned and stored to disk. Other TPM keys (e.g., as indicated at 108 and 110) can be generated as "children" of this base key, and used for various practical applications.

Each time a security-related software application runs, the TPM blob of the stored base key 106 is preferably loaded into the TPM. The TPM blob preferably contains components that are specific to the SRK 104 that existed at the time the TPM blob was generated, and will not load into any TPM whose SRK is different than the SRK that existed at the time the TPM blob was generated. If the TPM blob loads successfully, then it can be concluded that the TPM being used is the same TPM that was used previously. If the TPM blob does not load into the TPM, then this means the TPM has been replaced, and an automatic process will preferably recover the previous TPM's configuration and allow the base key 106 (and its child keys 108/110) to load.

To configure the new TPM identically to the one that was used to generate the original base key blob, the security administrator will be prompted for the password (100) that was used to configure the original TPM. A key will be derived from this password that will decrypt (112) the stored backup base key 114 that was previously used. Then, a TPM owner-auth will be derived from that password, which will be used to take ownership of the new TPM and generate a new SRK. The decrypted software base key will be imported into the TPM, with the new SRK as its parent. A new base key TPM blob will be generated that is specific to this new SRK, and this new TPM blob will be stored to disk. As a result of this automatic process, the new TPM is now ready for service with the same owner-auth 102 that had been configured previously.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   a security module that imports a generated base key; and acting to produce a first security module blob;
   a storage unit that stores a backup key;
   a circuit that ascertains the first security module is not usable in further operations via employing the security module blob;
   the security module acting to import the backup key; and
   the security module acting to produce a new security module blob;
   wherein the new security module blob has the same owner authentication as the first security module blob.

2. The apparatus according to claim 1, wherein said ascertaining occurs on loading of the first trusted platform module blob upon initiation of a further operation.

3. The apparatus according to claim 2, wherein said circuit acts to indicate that a currently used security module is the same as a previously used security module upon a successful load of the first security module blob.

4. The apparatus according to claim 2, wherein said circuit acts to indicate that a currently used security module is the not the same as a previously used security module upon an unsuccessful load of the security module blob.

5. The apparatus according to claim 4, wherein said circuit automatically reconfigures a new security module upon an unsuccessful load of the first security module blob using the same password as used to configure the security module.

6. The apparatus according to claim 5,
   wherein the security module provides a storage root key for the new security module blob corresponding to the base key.

7. The apparatus according to claim 6, wherein said circuit automatically acts to decrypt the base key used by the security module to generate a new storage root key.

8. The apparatus according to claim 7, wherein said circuit for automatically reconfiguring acts to import the decrypted base key into the security module and produce the new security module blob.

9. A method comprising:
   storing a base key outside of a security module;
   importing the base key into a security module,
   producing a first security module blob;
   ascertaining that the security module is not usable in further operations via employing the first security module blob;
   importing into the security module the backup key; and
   producing with the security module a new security module blob;
   wherein the new security module blob has the same owner authentication as the first security module blob.

10. The method according to claim 1, wherein said ascertaining comprises loading the first security module blob upon initiation of a further operation.

11. The method according to claim 10, wherein said ascertaining comprises loading the first module blob upon initiation of a security-related software application run.

12. The method according to claim 10, wherein said ascertaining comprises indicating that a currently used security module is the same as a previously used security module upon a successful load of the first security module blob.

13. The method according to claim 10, wherein said ascertaining comprises indicating that a currently used trusted platform module is not the same as a previously used trusted platform module upon an unsuccessful load of the first security module blob.

14. The method according to claim 13, further comprising automatically reconfiguring a new security module upon an unsuccessful load of the first security module blob.

15. The method according to claim 14, further comprising:
   providing a storage root key corresponding to the base key.

16. The method according to claim 15, wherein said automatically reconfiguring acts to decrypt the base key and generate a new storage root key.

17. A program storage device readable by machine, tangibly embodying a program of instructions executable by the machine to:
   store a base key outside of a security module;
   import the base key into a security module,
   produce a first security module blob;
   ascertain that the security module is not usable in further operations via employing the first security module blob;
   import into the security module the backup key; and
   produce with the security module a new security module blob;
   wherein the new security module blob has the same owner authentication as the first security module blob.

* * * * *